US 10,244,577 B2

(12) United States Patent
Devarayanigari et al.

(10) Patent No.: US 10,244,577 B2
(45) Date of Patent: Mar. 26, 2019

(54) METHOD AND USER EQUIPMENT FOR MANAGING EXTENDED DISCONTINUOUS RECEPTION (EDRX)

(71) Applicant: Samsung Electronics Co., Ltd., Suwon-si, Gyeonggi-do (KR)

(72) Inventors: Pavan Kumar Devarayanigari, Bangalore (IN); Lalith Kumar, Bangalore (IN); Diwakar Sharma, Bangalore (IN); Suraj Kumar Singh, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 18 days.

(21) Appl. No.: 15/383,319

(22) Filed: Dec. 19, 2016

(65) Prior Publication Data
US 2018/0167985 A1 Jun. 14, 2018

(30) Foreign Application Priority Data

Dec. 18, 2015 (IN) .......................... 6767/CHE/2015
Dec. 9, 2016 (IN) .......................... 6767/CHE/2015

(51) Int. Cl.
*H04W 76/28* (2018.01)
*H04W 52/02* (2009.01)

(52) U.S. Cl.
CPC ....... *H04W 76/28* (2018.02); *H04W 52/0216* (2013.01); *H04W 52/0225* (2013.01); *H04W 52/0229* (2013.01)

(58) Field of Classification Search
None
See application file for complete search history.

(56) References Cited

U.S. PATENT DOCUMENTS

2010/0099402 A1* 4/2010 Wu ...................... H04W 76/18
455/423
2015/0319734 A1* 11/2015 Zhang ................. H04W 68/005
455/458

(Continued)

FOREIGN PATENT DOCUMENTS

WO WO-2012146346 A1 11/2012

OTHER PUBLICATIONS

C1-161242_0846—3GPP TSG-CT WG1 Meeting #96 dated Feb. 15-19, 2016 in Jeju, Republic of Korea.

(Continued)

*Primary Examiner* — Kodzovi Acolatse
(74) *Attorney, Agent, or Firm* — Harness, Dickey & Pierce, P.L.C.

(57) ABSTRACT

A method for managing an extended Discontinuous Reception (eDRX) in a User Equipment (UE) including determining, by the UE, as to whether an eDRX enablement avoidance criterion is met, and causing, by the UE, to stop sending a request message, which is configured to enable the eDRX, to a network entity when the eDRX enablement avoidance criterion is met. The eDRX enablement avoidance criterion may include one of a data transmission pattern, a historic eDRX usage pattern, whether a configurable retry timer is deactivated, whether a number attempts made to enable the eDRX exceeds a threshold, whether a number of attempts made to enable and disable the eDRX exceeds a threshold, whether a request accept message including an indication that eDRX is not supported, is received from the network entity, or whether an indication of no eDRX support is received from the network entity may be provided.

10 Claims, 10 Drawing Sheets (56) References Cited

U.S. PATENT DOCUMENTS

2016/0192292 A1* 6/2016 Hoglund ........... H04W 52/0216
                                                    370/311
2016/0295504 A1* 10/2016 Wang .................... H04W 52/02
2018/0152978 A1* 5/2018 Jia ......................... H04W 76/10

OTHER PUBLICATIONS

C1-161243_0847—3GPP TSG-CT WG1 Meeting #96 dated Feb. 15-19, 2016 in Jeju, Republic of Korea.
C1-160731-3GPP TSG-CT WG1 Meeting #95bis dated Jan. 11-15, 2016 in Nashville (USA).
C1-160732-3GPP TSG-CT WG1 Meeting #95bis dated Jan. 11-15, 2016 in Nashville (USA).

* cited by examiner

METHOD AND USER EQUIPMENT FOR MANAGING EXTENDED DISCONTINUOUS RECEPTION (EDRX)

PRIORITY

This application claims priority under 35 U.S.C. § 119(a) to Indian Provisional Patent Application Ser. No. 6767/CHE/2015 (PS), which was filed on Dec. 18, 2015 in the Indian Intellectual Property Office, and to Indian Complete Patent Application Serial No. 6767/CHE/2015 (CS), which was filed on Dec. 9, 2016 in the Indian Intellectual Property Office, the entire disclosure of each of these applications is incorporated herein by reference.

BACKGROUND

1. Field

Example embodiments disclosed herein relate to wireless communication systems, and more particularly to methods and/or User Equipments (UEs) for managing extended idle mode DRX (eDRX).

2. Description of Related Art

In the existing 3GPP standard, a UE can request the use of an eDRX cycle during an ATTACH procedure or a Routing Area Update (RAU) procedure or a Tracking Area update (TAU) procedure by including eDRX parameters Information Element (IE) (see 3GPP Technical Specification (TS) 23.682 [11A] and 3GPP Technical Specification (TS) 23.060 [74])The UE may not request the use of the eDRX during:

1. an ATTACH for emergency bearer services procedure,
2. a RAU procedure for initiating a PDN connection for the emergency bearer services, or
3. the RAU procedure when the UE has the PDN connection established for the emergency bearer services.

After receiving the request from the UE, the network may accept the request to use the eDRX by providing the eDRX parameters IE when accepting the ATTACH procedure, the RAU procedure, or the TAU procedure. Further, the UE may use extended idle mode DRX cycle only when the network has provided the extended DRX parameters IE during the last ATTACH procedure, the RAU procedure, or the TAU procedure. When the UE intends to use the eDRX, the UE may include the extended DRX parameters IE in ATTACH procedure, the RAU procedure, or the TAU procedure.

SUMMARY

Some example embodiments provide methods and/or UEs for managing an extended Discontinuous Reception (eDRX).

Some example embodiments provide methods for detecting, by a UE, that an eDRX enablement avoidance criterion is met.

Some example embodiments provide methods for causing, by a UE, to avoid sending a request to a network entity to enable an eDRX when an eDRX enablement avoidance criterion is met.

Some example embodiments provide methods for sending, by a UE, a request to a network entity to enable an eDRX when an eDRX enablement criterion is met and causing, by the UE, to avoid sending a request to enable the eDRX when the eDRX enablement criteria are not met.

Some example embodiments provide methods for detecting, by a UE, that an eDRX disablement criterion is met.

Some example embodiments provide methods for sending, by a UE, a request to a network entity to disable the eDRX when a disablement eDRX criterion is met.

According to an example embodiment, a method for managing an eDRX in a UE. The method includes detecting, by the UE, that eDRX enablement avoidance criteria are met. Further, the method includes causing, by the UE, to avoid sending a request to a network entity to enable the eDRX when the eDRX enablement avoidance criteria are met.

According to an example embodiment, a method for managing an extended Discontinuous Reception (eDRX) in a User Equipment (UE) may include determining, by the UE, as to whether an eDRX enablement avoidance criterion is met, and causing, by the UE, to stop sending a request message, which is configured to enable the eDRX, to a network entity when the eDRX enablement avoidance criterion is met. The eDRX enablement avoidance criterion may include one of a data transmission pattern, a historic eDRX usage pattern, whether a configurable retry timer is deactivated, whether a number attempts made to enable the eDRX exceeds a threshold, whether a number of attempts made to enable and disable the eDRX exceeds a threshold, whether a request accept message including an indication that eDRX is not supported, is received from the network entity, or whether an indication of no eDRX support is received from the network entity.

According to an example embodiment, a method for managing an extended Discontinuous Reception (eDRX) in a User Equipment (UE) may include determining, by the UE, as to whether an eDRX enablement criterion is met, sending, by the UE, a request message to a network entity to enable the eDRX when the eDRX enablement criterion is met, and causing, by the UE, to stop sending the request message when the eDRX enablement criterion is not met. The eDRX enablement criterion may include one of a data transmission pattern, a historic eDRX usage pattern, whether a configurable retry timer is active, whether a number attempts made to enable the eDRX is within a threshold, whether a number of attempts made to enable and disable the eDRX is within a threshold, whether a request accept message, which includes information indicating that the eDRX is supported, is received from the network entity, and whether an indication that the eDRX is supported, is received from the network entity.

According to an example embodiment, a method for managing an extended Discontinuous Reception (eDRX) in a User Equipment (UE) may include determining, by the UE, as to whether an eDRX disablement criterion is met, and sending, by the UE, a request message to a network entity to disable the eDRX when the disablement eDRX criterion is met.

According to an example embodiment, a User Equipment (UE) for managing an extended Discontinuous Reception (eDRX) may include a memory, a processor coupled to the memory, and an eDRX manager. The eDRX manager may be configured to determine as to whether an eDRX enablement avoidance criterion is met, and cause to stop sending a request message, which is configured to enable the eDRX, to a network entity when the eDRX enablement avoidance criterion is met. The eDRX enablement avoidance criterion may include one of a data transmission pattern, a historic eDRX usage pattern, whether a configurable retry timer is deactivated, whether a number attempts made to enable the eDRX exceeds a threshold, whether a number of attempts made to enable and disable the eDRX exceeds a threshold, whether a request accept message including an indication that eDRX is not supported is received from the network entity, or whether an indication of no eDRX support is received from the network entity.

According to an example embodiment, a User Equipment (UE) for managing an extended Discontinuous Reception (eDRX) may include a memory, a processor coupled to the memory. and an eDRX manager. The eDRX manager may be configured to determine as to whether an eDRX enablement criterion is met, send a request message to a network entity to enable the eDRX when the eDRX enablement criterion is met, and cause to stop sending the request message when the eDRX enablement criterion is not met. The eDRX enablement criterion may include one of a data transmission pattern, a historic eDRX usage pattern, whether a configurable retry timer is active, whether a number attempts made to enable the eDRX is within a threshold, whether a number of attempts made to enable and disable the eDRX is within a threshold, whether received a request accept message, which includes information indicating that the eDRX is supported from the network entity, or whether an indication that the eDRX is supported is received from the network entity.

According to an example embodiment, a User Equipment (UE) for managing an extended Discontinuous Reception (eDRX) may include a memory, a processor coupled to the memory, and an eDRX manager. The eDRX manager is configured to determine as to whether an eDRX disablement criterion is met, and send a request message to a network entity to disable the eDRX when the eDRX disablement criterion is met.

According to an example embodiment, a method for managing an extended Discontinuous Reception (eDRX) in a User Equipment (UE) may include determining, by the UE, as to one of whether an eDRX enablement avoidance criterion is met or whether an eDRX enablement criterion is met, and causing, by the UE, to stop sending of a request message, which is configured to enable the eDRX, to a network entity one of when the eDRX enablement avoidance criterion is met or when the eDRX enablement criterion is not met.

Unlike the conventional systems and methods, methods according to some example embodiments may be used to handle the eDRX in the UE. The UE may request the network entity to disable the eDRX cycle. One of such methods is to initiate a specific procedure such as, for example, but not limited to, a RAU procedure, a TAU procedure, or an Attach procedure for indicating to the network entity that the eDRX is not required. However, the UE may use other existing Non-Access Stratum (NAS) procedures to request the network of disabling of the eDRX cycle.

Further, methods according to some example embodiments may be used to mitigate or prevent eDRX mismatch issue between the UE and the network entity during registration reject (e.g., congestion). Further, such methods may be used to mitigate or prevent continuous signaling between the UE and the network entity during the eDRX enabling and/or disabling, thereby improving performance of the UE.

These and other aspects of the example embodiments described herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of the example embodiments without departing from the spirit thereof, and example embodiments include all such modifications.

BRIEF DESCRIPTION OF DRAWINGS

Example embodiments are illustrated in the accompanying drawings, throughout which like reference letters indicate corresponding parts in the various figures. The example embodiments herein will be better understood from the following description with reference to the drawings, in which.

DETAILED DESCRIPTION

Various example embodiments of the present disclosure will now be described in detail with reference to the accompanying drawings. In the following description, specific details such as detailed configuration and components are merely provided to assist the overall understanding of example embodiments of the present disclosure. Therefore, it should be apparent to those skilled in the art that various changes and modifications of the example embodiments described herein can be made without departing from the scope and spirit of the present disclosure. In addition, descriptions of well-known functions and constructions are omitted for clarity and conciseness.

Also, the various example embodiments described herein are not necessarily mutually exclusive, as some example embodiments can be combined with one another to form new example embodiments.

Herein, the term "or" as used herein, refers to a non-exclusive or unless otherwise indicated. The example embodiments used herein are intended merely to facilitate an understanding of ways in which inventive concepts are practiced and to further enable those skilled in the art to practice example embodiments herein. Accordingly, the example embodiments should not be construed as limiting the scope of example embodiments herein.

As is traditional in the field, example embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the disclosure Likewise, the blocks of the example embodiments may be physically combined into more complex blocks without departing from the scope of the disclosure.

Referring now to the drawings, and more particularly to FIGS. 1A through 6, where similar reference characters denote corresponding features consistently throughout the figures, some example embodiments will be described.

Figure 1A:
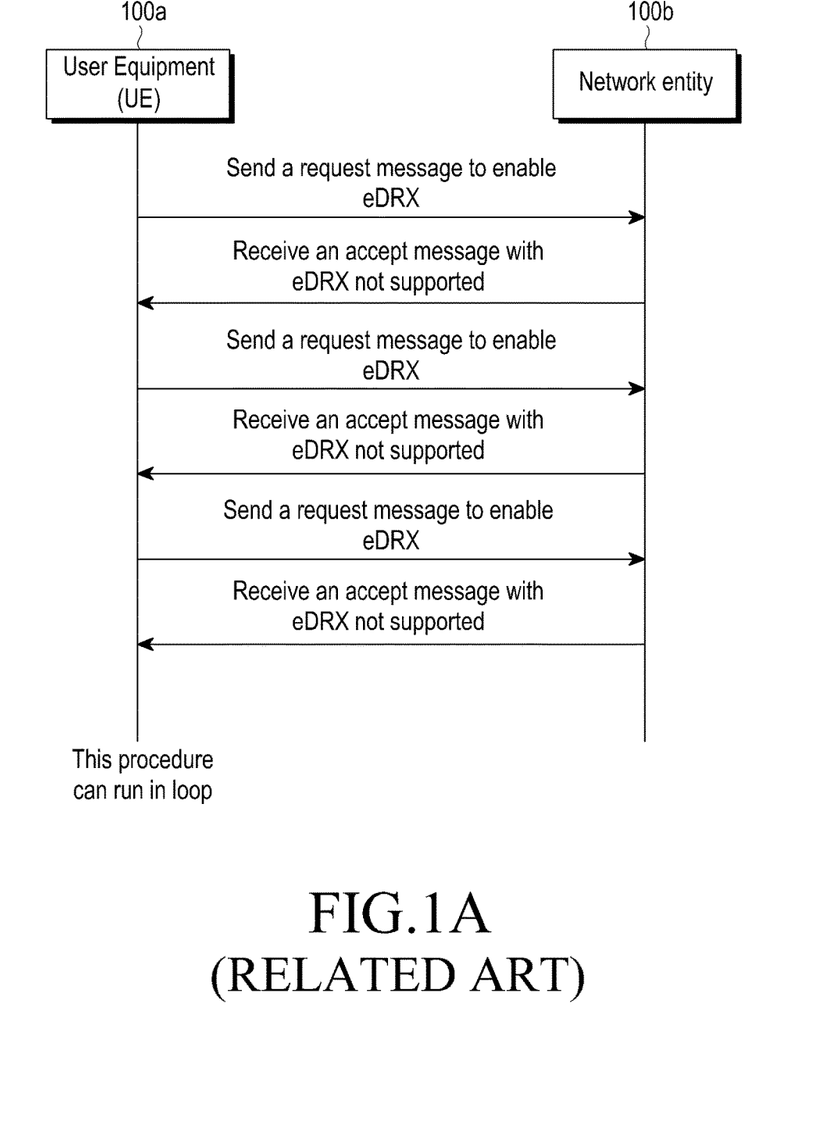
FIG. 1A is a sequence diagram in which a UE continuously requests a network entity to enable an eDRX feature, according to a related art.
Figure 1B:
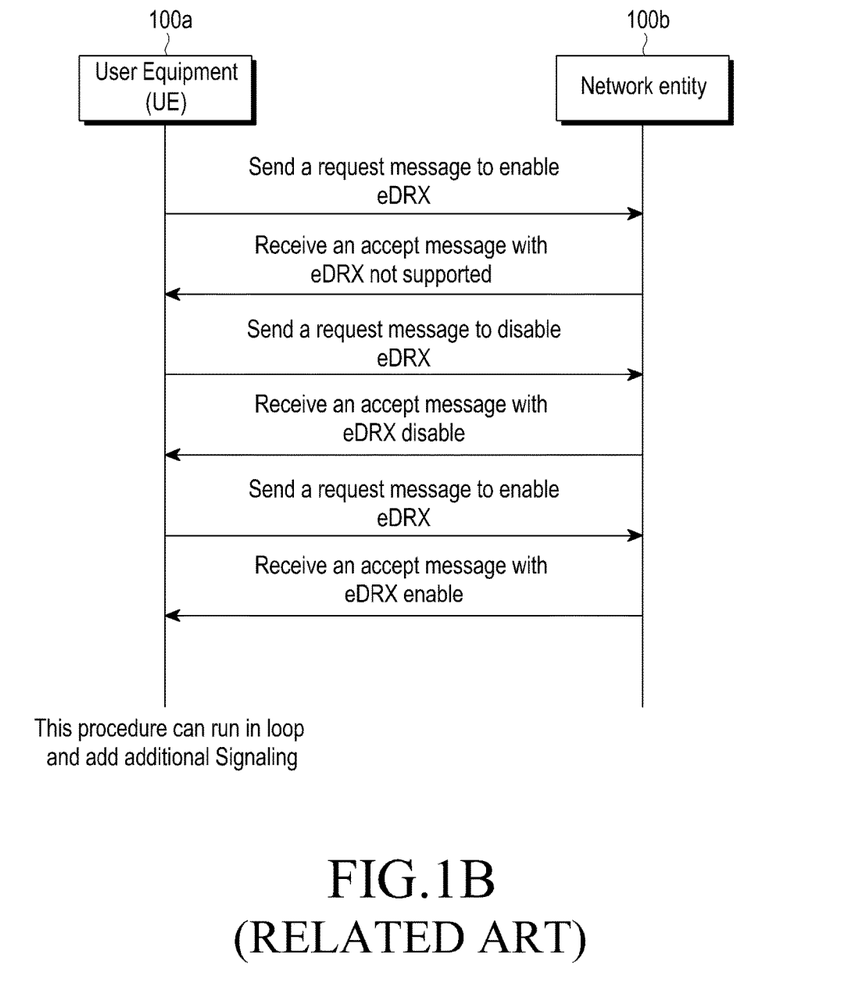
FIG. 1B is a sequence diagram in which a UE continuously requests a network entity to enable and disable an eDRX feature, according to a related art.
Figure 1C:
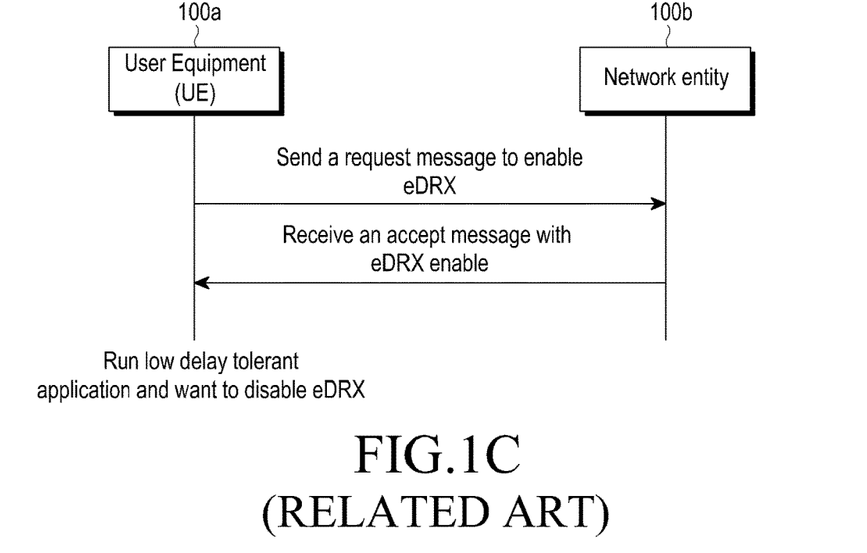
FIG. 1C is a sequence diagram in which a UE intends to run delay intolerant applications and disable an eDRX feature, according to a related art.

The following features as described in conjunctions with FIGS. 1A-1C are not handled or not addressed in current specification. Thus, creating a gap at the UE side implementation. The utilization of an eDRX feature at the UE side is not optimized with the current specification.

FIG. 1A is a sequence diagram in which a UE 100a continuously requests a network entity 100b to enable an eDRX feature, according to a related art. In an example embodiment, a wireless communication system may include a UE 100a and a network entity 100b. The wireless communication system may be, for example, a Long Term Evolution (LTE), a Universal Mobile Telecommunications System (UMTS), a Global System for Mobile communication (GSM), or the like. The UE 100a may include but not limited to, a mobile phone, a smart phone, Personal Digital Assistants (PDAs), a tablet, a phablet, a consumer electronic device, or any other electronic device. The network entity 100b may include but not limited to, Mobility Management Entity (MME).

As shown in the FIG. 1A, there is no limit in the number of attempts made by the UE 100a to enable the eDRX feature (e.g., eDRX). Consider a scenario where the UE 100a supports the eDRX feature and the network entity 100b does not support the eDRX feature. In this example embodiment, the UE 100a may send a request to the network entity 100b to enable the eDRX feature. In an example embodiment, the request may be an ATTACH message, a RAU message, or a TAU message. As the network entity 100b does not support the eDRX feature, the network entity 100b may send an accept message including that the eDRX feature is not supported to the UE 100a. In an example embodiment, the accept message can be an ATTACH accept message, a RAU accept message, or a TAU accept message.

As shown in the FIG. 1A, because the UE 100a supports the eDRX feature, the UE 100a may continuously send the requests to the network entity 100b (e.g., continuously performs a ATTACH procedure, a RAU procedure, or a TAU procedure) to enable the eDRX feature to continuously enable the eDRx feature in same RA or same public land mobile network (PLMN), which includes Equivalent PLMN (EPLMN). Thus congestion at the network entity 100b, wastage of radio resources, battery consumption at the UE 100a, and/or the like may occur.

Further, as shown in the FIG. 1A, although the network entity 100b does not support the eDRX feature, the UE 100a may send the request to the network entity 100b to enable the eDRX feature after receiving the accept message including that the eDRX feature is not supported from the network entity 100b. This adds additional signaling steps, thus leads to congestion at the network entity 100b.

FIG. 1B is a sequence diagram in which the UE 100a continuously requests the network entity 100b to enable and disable the eDRX feature, according to a related art. The wireless communication system may include a UE 100a and a network entity 100b.

As shown in the FIG. 1B, there is no restriction (or limitation) on the number of attempts made by the UE 100a to enable and/or disable the eDRX feature. In a case where the UE 100a and the network entity 100b support the eDRX feature, the UE 100a may send the request to the network entity 100b to enable the eDRX feature. As the network entity 100b support the eDRX feature, the network entity 100b may send the accept message including that the eDRX feature is enabled to the UE 100a. Further, in order to disable the eDRX feature, the UE 100a may send the request to the network entity 100b. After receiving the request, the network entity 100b may send the accept message including that the eDRX feature is disabled to the UE 100a.

Further, as shown in the FIG. 1B, if the UE 100a is desired to enable the eDRx feature, then the UE 100a may send the request to enable the eDRX feature and the same may be accepted by the network entity 100b. If the UE 100a is desired to disable the eDRX feature, then the UE 100a may send the request to disable the eDRX feature and the same may be accepted by the network entity 100b. There is no restriction in the number of attempts made by the UE 100a to enable and disable the eDRX feature. Thus, excessive signaling may be caused at the network entity 100b.

FIG. 1C is a sequence diagram in which the UE 100a runs delay intolerant applications and disables the eDRX feature, according to a related art. The wireless communication system may include a UE 100a and a network entity 100b.

As shown in the FIG. 1C, there is no provision for disabling the eDRX feature by the UE 100a. In a case where the UE 100a and the network entity 100b support the eDRX feature, the UE 100a may send the request to the network entity 100b to enable the eDRX feature. As the network entity 100b support the eDRX feature, the network entity 100b may send the accept message including that the eDRX feature is enabled to the UE 100a. If the UE 100a runs a delay intolerant application(s), then the UE 100a may not disable the eDRX feature in the current specification, thereby causing, for example, a signaling overhead at the network entity 100b.

Figure 1D:
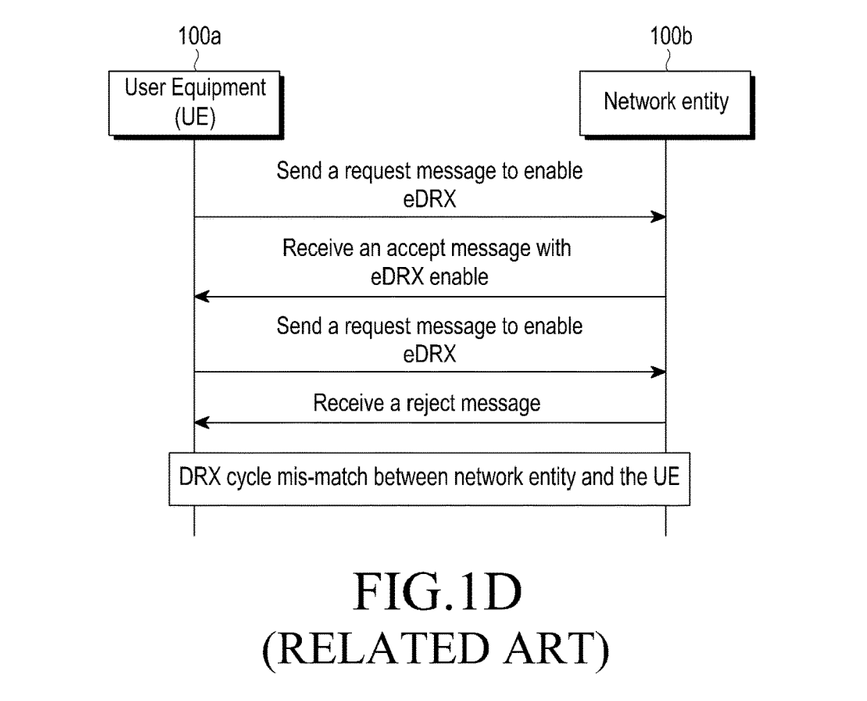
FIG. 1D is a sequence diagram in which an eDRX cycle mismatch exists between a UE and a network entity after receiving a reject message by the UE, according to a related art.

FIG. 1D is a sequence diagram in which the eDRX cycle mismatch exists between the UE 100a and the network entity 100b after receiving a reject message by the UE 100a, according to a related art. The wireless communication system may include a UE 100a and a network entity 100b.

As shown in the FIG. 1D the UE 100a and the network entity 100b may support the eDRX feature. In this configuration, the UE 100a may send the request to the network entity 100b to enable the eDRX feature. Because the network entity 100b support the eDRX feature, the network entity 100b may send the accept message including that the eDRX feature is enabled to the UE 100a. Further, the UE 100a may send the request to the network entity 100b to enable the eDRX feature, and the network entity 100b may send the reject message to the UE 100a if there exists the eDRX cycle mismatch between the network entity 100b and the UE 100a. In an example embodiment, the reject message may include, but not limited to, an ATTACH reject message, a RAU reject message, or a TAU reject message.

Figure 2A:
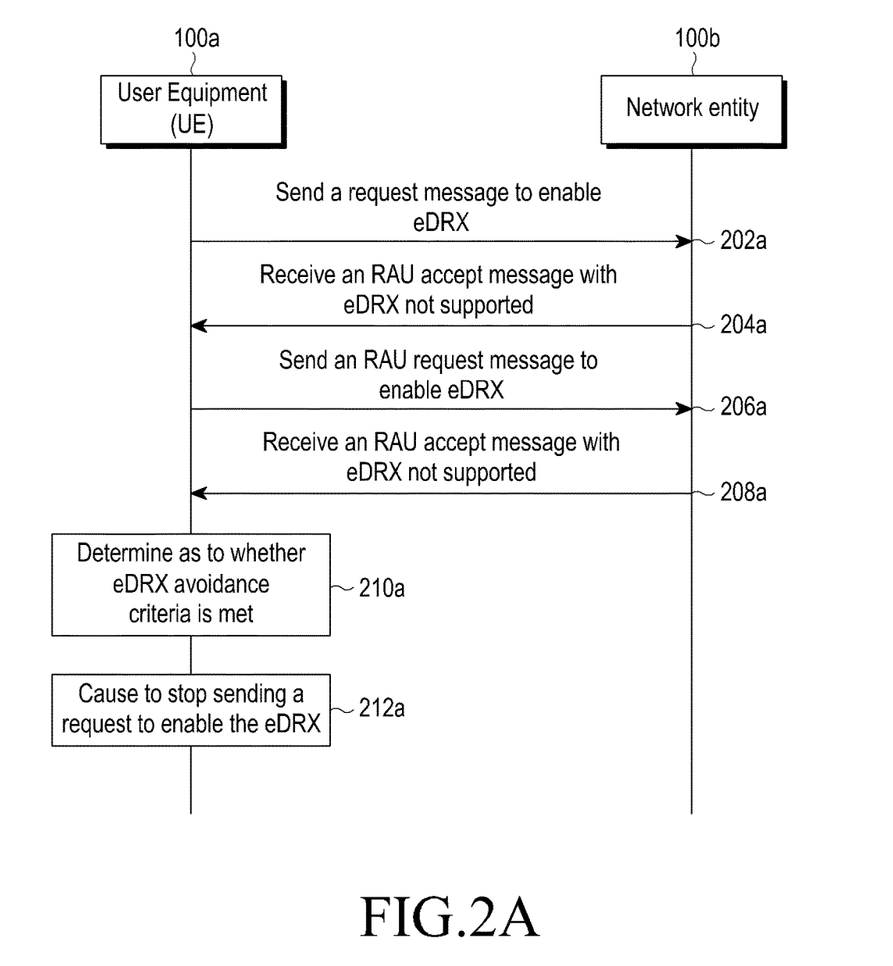
FIG. 2A is a sequence diagram illustrating a method for causing to discontinue sending of a request message to a network entity to enable an eDRX feature, according to an example embodiment as disclosed herein.

FIG. 2A is a sequence diagram illustrating a method for causing to avoid, stop, or discontinue sending of the request message to the network entity 100b to enable the eDRX feature, according to an example embodiment as disclosed herein. In an example embodiment, the wireless communication system may include a UE 100a and a network entity 100b. The sequence of communications between the UE 100a and the network entity 100b are described below:

At step 202a, the UE 100a may send a request message to the network entity 100b to enable the eDRX.

At step 204a, after receiving the request message from the UE 100a, the network entity 100b may send an accept message including that the eDRX is not supported to the UE 100a.

At step 206a, the UE 100a may send the RAU request message to the network entity 100b to enable the eDRX.

At step 208a, after receiving the RAU request message from the UE 100a, the network entity 100b may send the RAU accept message including that the eDRX is not supported to the UE 100a.

At step 210a, the UE 100a may determine as to whether an eDRX enablement avoidance criterion is met. In an example embodiment, the eDRX enablement avoidance criterion may be whether a configurable retry timer is deactivated. In another example embodiment, the eDRX enablement avoidance criterion may be whether the number of attempts made to enable the eDRX exceeds a threshold.

At step 212a, when the eDRX enablement avoidance criterion is met, the UE 100a may cause to avoid, stop, or discontinue sending of the request message to enable the eDRX.

Unlike conventional systems and/or methods, methods according to some example embodiments may include limit the number of attempts to initiate the request for enabling the eDRX based on a threshold number of attempts or the configurable retry timer.

Figure 2B:
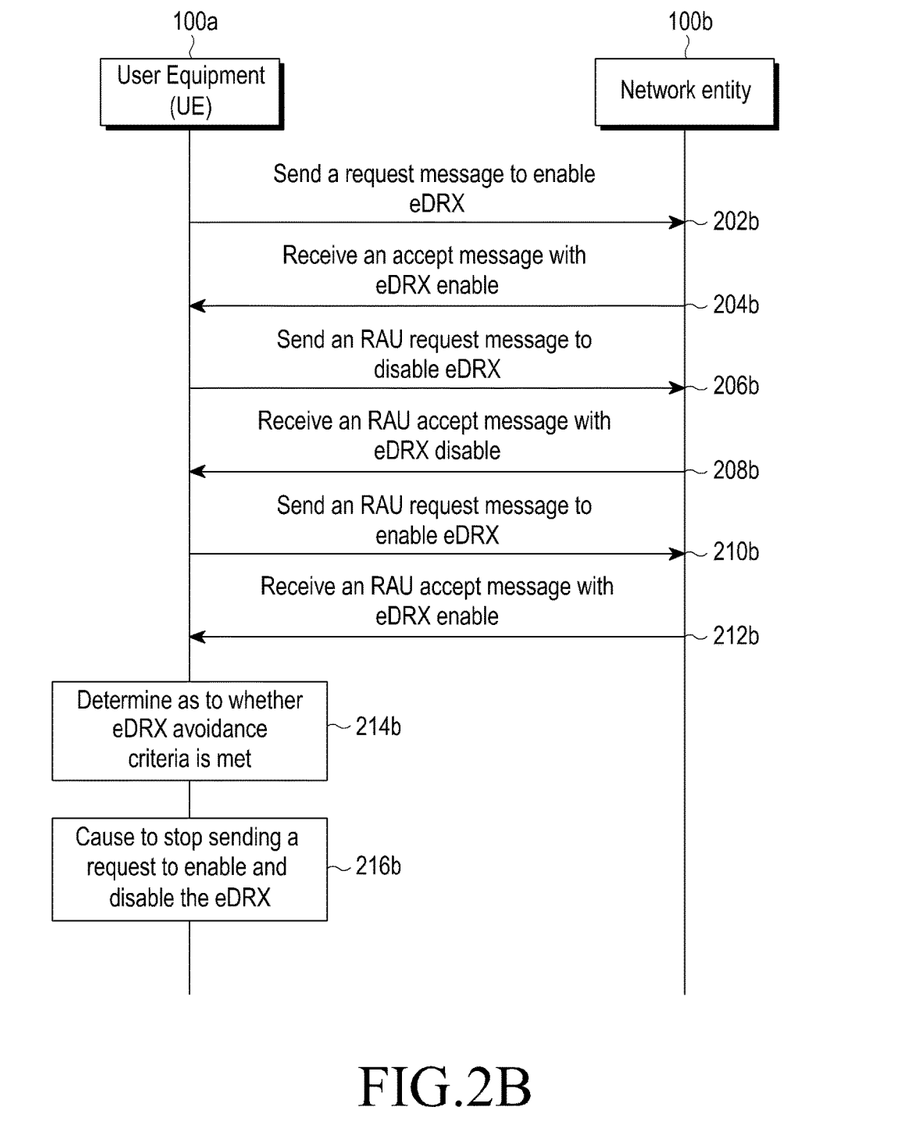
FIG. 2B is a sequence diagram illustrating a method for causing to discontinue sending of a request message to enable and disable an eDRX, according to an example embodiment as disclosed herein.

FIG. 2B is a sequence diagram illustrating a method for causing to discontinue sending of the request to enable and disable the eDRX, according to an example embodiment as disclosed herein. In an example embodiment, the wireless communication system may include a UE 100a and a network entity 100b. The sequence of communications between the UE 100a and the network entity 100b may be described below:

At step 202b, the UE 100a may send a request message to the network entity 100b to enable the eDRX.

At step 204b, after receiving the request from the UE 100a, the network entity 100b may send an accept message including that the eDRX is enabled to the UE 100a.

At step 206b, the UE 100a may send a RAU request message to the network entity 100b to disable the eDRX.

At step 208b, after receiving the RAU request message from the UE 100a, the network entity 100b may send a RAU accept message including that the eDRX is disabled to the UE 100a.

At step 210b, the UE 100a may sends the RAU request message to the network entity 100b to enable the eDRX.

At step 212b, after receiving the RAU request message from the UE 100a, the network entity 100b may send the RAU accept message including that the eDRX is enabled to the UE 100a.

At step 214b, the UE 100a may determine as to whether an eDRX avoidance criterion is met. In an embodiment, the eDRX avoidance criterion may be whether a configurable retry timer is deactivated. In another example embodiment, the eDRX avoidance criterion may be whether the number of attempts made to enable and/or disable the eDRX exceeds a threshold.

At step 216b, when the eDRX enablement criteria are met, the UE 100a may discontinue sending of the request message to enable and disable the eDRX.

Unlike conventional systems and/or methods, methods according to some example embodiments may limit the number of attempts for enabling and/or disabling the eDRX based on the threshold number of attempts or the configurable retry timer.

Figure 2C:
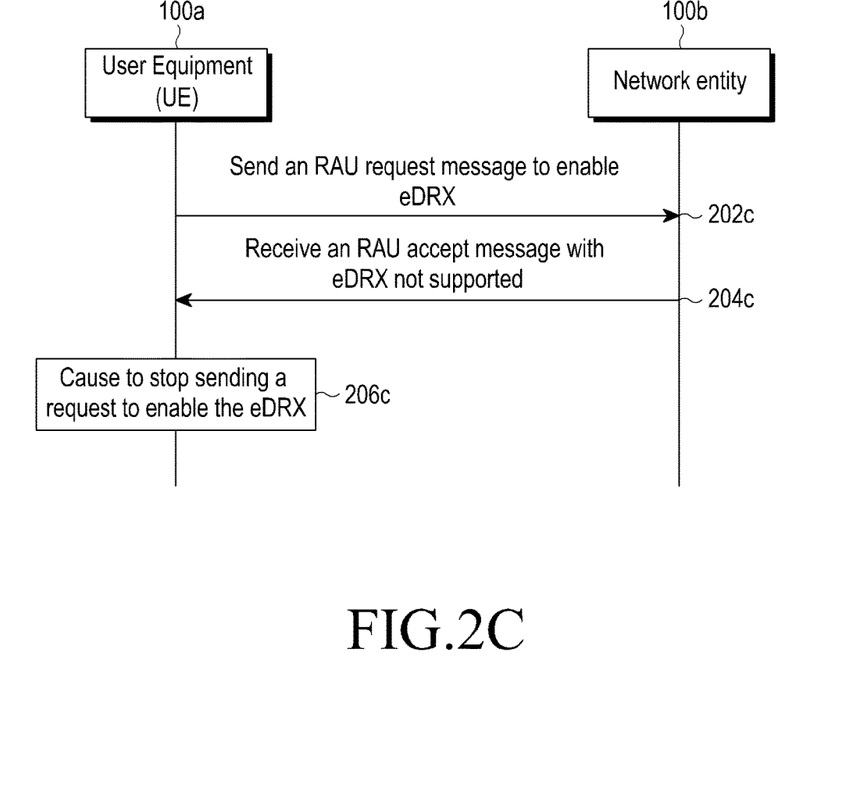
FIG. 2C is a sequence diagram illustrating a method for causing to discontinue sending of a request message by a UE to enable an eDRX after receiving an accept message including that an eDRX is not supported from a network entity, according to an example embodiment as disclosed herein.

FIG. 2C is a sequence diagram illustrating a method for causing to discontinue sending of the request message by the UE 100a to enable the eDRX after receiving the accept message including an indication that the eDRX is not supported from the network entity 100b, according to an example embodiment as disclosed herein. In an example embodiment, the wireless communication system may include a UE 100a and a network entity 100b. The sequence of communications between the UE 100a and the network entity 100b are described below:

At step 202c, the UE 100a may send an RAU request message to the network entity 100b to enable the eDRX.

At step 204c, after receiving the RAU request message from the UE 100a, the network entity 100b may send an RAU accept message including that the eDRX is not supported to the UE 100a.

At step 206c, after receiving the RAU accept message including that the eDRX is not supported, the UE 100a may discontinue sending of the RAU request to enable the eDRX to the network entity 100b.

Unlike conventional systems and/or methods, methods according to an example embodiment may discontinue or stop the RAU procedure or TAU procedure, which is performed by the UE 100a to enable the eDRX, after receiving the accept RAU message including that the eDRX is not supported from the network entity 100b. This restriction may be followed as long as the UE 100*a* remains in the same registration area (e.g., RAI or TAI list).

Figure 2D:
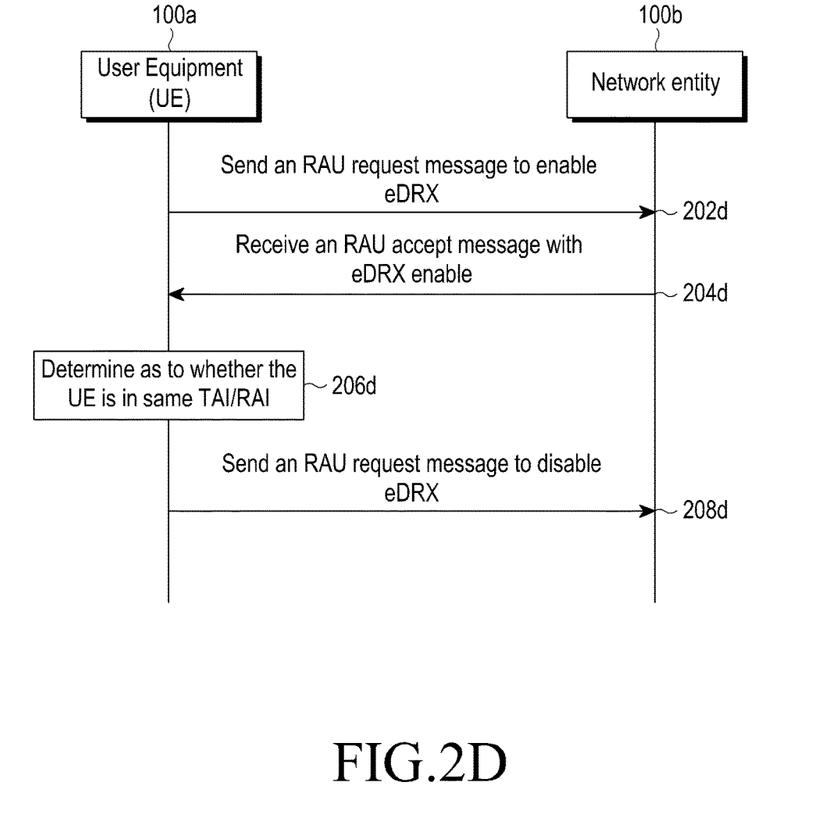
FIG. 2D is a sequence diagram illustrating a method for sending the request message to disable an eDRX when a UE is in the same Routing Area Identity (RAI) list or the same Tracking Area Identity (TAI) list, according to an example embodiment as disclosed herein.

FIG. 2D is a sequence diagram illustrating a method for sending the request to disable the eDRX when the UE 100*a* is in the same TAI or RAI, according to an example embodiment as disclosed herein. In an example embodiment, the wireless communication system may include a UE 100*a* and a network entity 100*b*. The sequence of communications between the UE 100*a* and the network entity 100*b* are described below:

At step 202*d*, the UE 100*a* may send an RAU request message to the network entity 100*b* to enable the eDRX.

At step 204*d*, after receiving the RAU request message from the UE 100*a*, the network entity 100*b* may send the RAU accept message including that the eDRX is enabled to the UE 100*a*.

At step 206*d*, the UE 100*a* may determine as to whether the UE 110*a* is in the same TAI list or the same RAI list.

At step 208*d*, when the UE 100*a* is determined to be in the same TAI or the RAI, the UE 100*a* may be configured to send the RAU request message to disable the eDRX to the network entity 100*b*.

Unlike conventional systems and/or methods, methods according to some example embodiments may include triggering of the RAU procedure or the ATTACH procedure to disable the eDRX feature after determining that the UE 100*a* is in the same TAI or the same RAI.

Figure 2E:
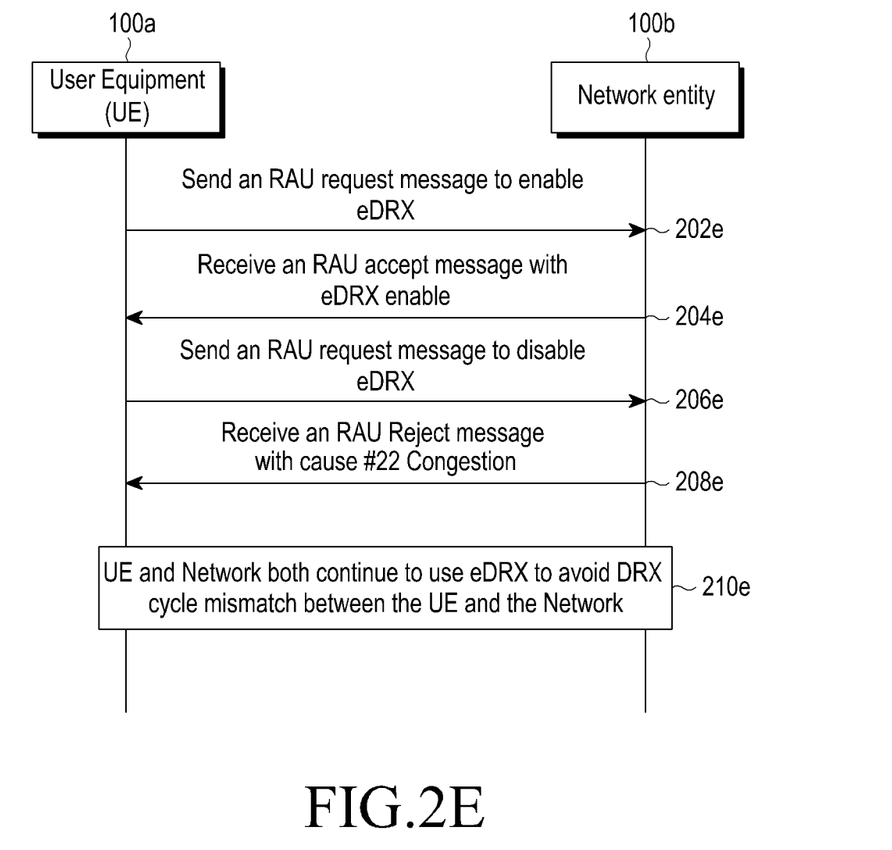
FIG. 2E is a sequence diagram illustrating a method for avoiding a DRX cycle mismatch between the UE and the network entity, according to an example embodiment as disclosed herein.

FIG. 2E is a sequence diagram illustrating a method for avoiding a DRX cycle mismatch between the UE 100*a* and the network entity 100*b*, according to an example embodiment as disclosed herein. In an example embodiment, the wireless communication system may include a UE 100*a* and a network entity 100*b*. The sequence of communications between the UE 100*a* and the network entity 100*b* are described below:

At step 202*e*, the UE 100*a* may send an RAU request message to the network entity 100*b* to enable the eDRX.

At step 204*e*, the UE 100*a* may receive an RAU accept message including that the eDRX is enabled from the network entity 100*b*.

At step 206*e*, the UE 100*a* may send the RAU request message to the network entity 100*b* to disable the eDRX.

At step 208*e*, the UE 100*a* may receive the RAU Reject message with cause #22 congestion as defined in 3GPP TS 24.008 or 24.301 from the network entity 100*b*.

At step 210*e*, the UE 100*a* and the network entity 100*b* both may continue to use the eDRX to avoid the DRX cycle mismatch between the UE 100*a* and the network entity 100*b*.

Figure 3:
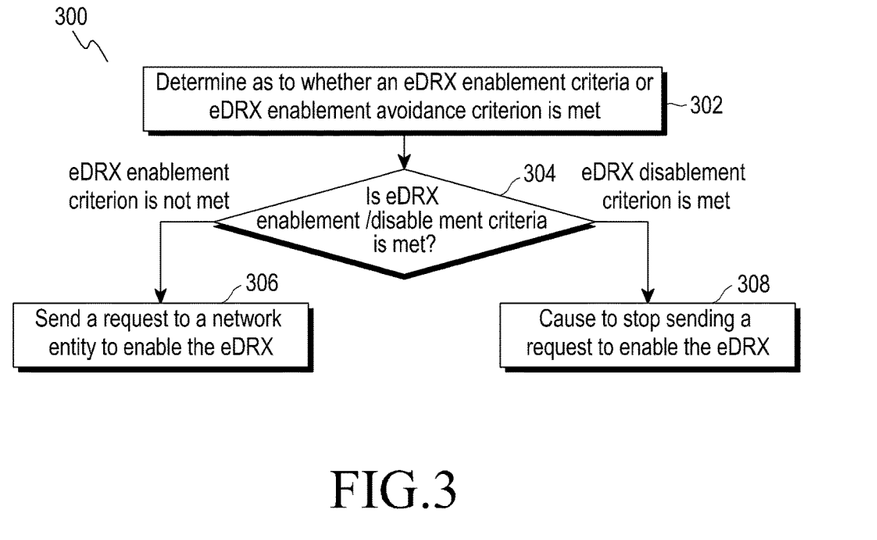
FIG. 3 is a flow chart illustrating a method for managing an eDRX in a UE by, sending a request message to enable the eDRX when an eDRX enablement criterion is met, and avoid or stop sending of the request message to enable the eDRX when an eDRX disablement criterion is met, according to an example embodiment as disclosed herein.

FIG. 3 is a flow chart 300 illustrating a method for managing an eDRX in a UE by, sending the request message to enable the eDRX when the eDRX enablement criterion is met and avoid, stop or discontinue sending of the request to enable the eDRX when the eDRX disablement criterion is met, according to an example embodiment as disclosed herein. At step 302, the method may determine as to whether the eDRX enablement criterion is met. The method may allow the UE 100*a* to determine whether the eDRX enablement criterion is met.

In an example embodiment, the eDRX enablement criterion may include one of a data transmission pattern, a historic eDRX usage pattern, that the configurable retry timer is deactivated, that the number attempts made to enable the eDRX exceeds the threshold, that the number of attempts made to enable and/or disable the eDRX exceeds the threshold, that a request accept message including that an eDRX is not supported is received from the network entity, of that an indication of no eDRX support is received from the network entity.

If it is determined that the eDRX enablement criterion is not met at step 304, the request message may be sent to the network entity to enable the eDRX at step 306. The method may allow the UE to send the request message to the network entity to enable the eDRX. In an example embodiment, the request message to enable the eDRX may be the RAU message, the TAU message, or the ATTACH message. In an example embodiment, the UE may request the network entity to enable the eDRX with different eDRX periods. In an example embodiment, the UE may requests the network entity 100*b* to enable the eDRX with different eDRX cycles.

At step 304, if it is determined that the eDRX enablement avoidance criterion is met, at step 308, the method includes causing to avoid, stop, or discontinue sending of the request message to enable the eDRX to the network entity. The method may allow the UE to cause to avoid, stop or discontinue sending of the request to enable the eDRX to the network entity.

The various actions, acts, blocks, steps, or the like in the flow chart 300 may be performed in the order presented, in a different order, or simultaneously. Further, in some example embodiments, some of the actions, acts, blocks, steps, or the like may be omitted, added, modified, or skipped without departing from the scope of the inventive concepts.

Figure 4:
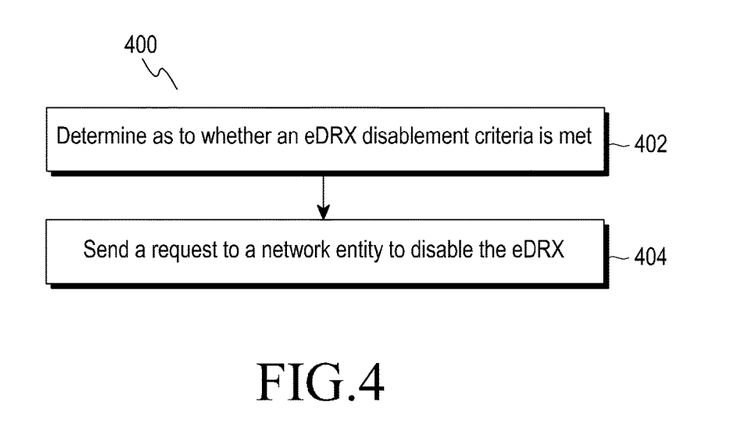
FIG. 4 is a flow chart illustrating a method for managing an eDRX in a UE by sending a request message to disable the eDRX to a network entity, according to an example embodiment as disclosed herein.

FIG. 4 is a flow chart 400 illustrating a method for managing the eDRX in the UE 100*a* by sending the request message to disable the eDRX to the network entity 100*b*, according to an example embodiment as disclosed herein. At step 402, the method may include determining as to whether an eDRX disablement criterion is met. The method may allow a UE to determine that the eDRX disablement criterion is met.

At step 404, the method may include sending the request to the network entity to disable the eDRX. The method may allow the UE 100*a* to send the request to the network entity to disable the eDRX. In an example embodiment, the eDRX disablement criterion may include receiving a reject message from the network entity 100*b* or detecting an abnormal failure.

The various actions, acts, blocks, steps, or the like in the flow chart 400 may be performed in the order presented, in a different order, or simultaneously. Further, in some example embodiments, some of the actions, acts, blocks, steps, or the like may be omitted, added, modified, or skipped without departing from the scope of the inventive concepts.

Figure 5:
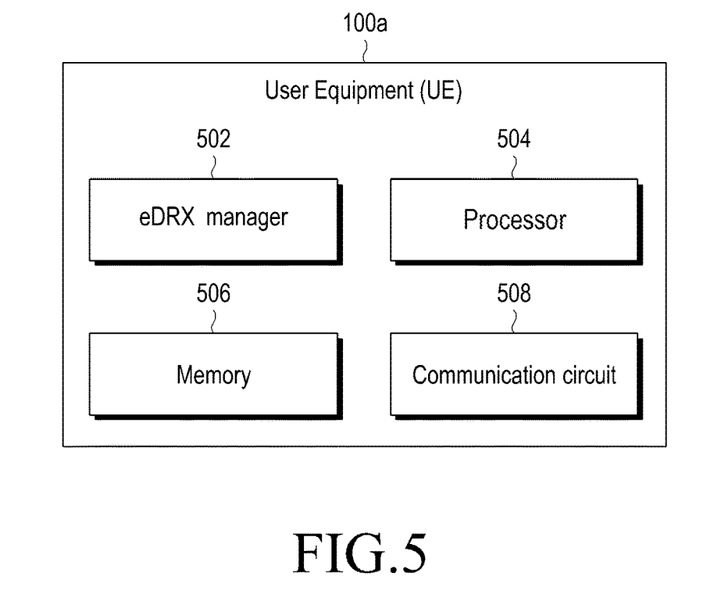
FIG. 5 illustrates a block diagram of a UE for managing an eDRX, according to an example embodiment as disclosed herein.

FIG. 5 illustrates a block diagram of a UE 100*a* for managing the eDRX, according to an example embodiment as disclosed herein. In an example embodiment, the UE 100*a* may include an eDRX manager 502, a processor 504, a memory 506, and a communication circuit 508. The functionalities of the eDRX manager 502 have been explained in conjunction with the FIGS. 2A-4. The processor 504 may communicate with other parts in the UE 100*a* to perform various operations related to the proposed methods without departing from the scope of the inventive concepts.

The memory 506 may include one or more computer-readable storage media. The memory 506 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 506 may, in some examples, be considered a non-transitory storage medium. The term "non-transitory" may indicate that the storage medium is not embodied in a carrier wave or a propagated signal. However, the term "non-transitory" should not be interpreted that the memory 506 is non-movable. In some examples, the memory 506 can be configured to store larger amounts of information than the memory. In certain examples, a non-transitory storage medium may store data that can, over time, change (e.g., in Random Access Memory (RAM) or cache). The communication circuit 508 may communicate internally with the other parts and/or communicate externally with networks.

In an example embodiment, in a case where the UE 100a may have previously negotiated eDRX parameters in a desired procedure (e.g., the TAU procedure or the RAU procedure) and the UE 100a may have started using the eDRX cycles, the UE 100a may initiate the desired procedure again, but the desired procedure may fail, e.g., due to specific procedure abnormal cases as defined in 3GPP TS 24.008 or 24.301, due to specific procedure reject example cause value #22 as defined in 3GPP TS 24.008 or 24.301). Then, the UE 100a may continue to use the previously negotiated eDRX values in the previous desired procedure and apply the eDRX cycles. In some example embodiments, the UE 100a does not apply the eDRX cycles. Then, the network entity 100b may use negotiated eDRX cycles whereas the UE 100a may use normal DRX cycles. Thus, page missing scenarios may be resulted.

Irrespective of the network entity 100b having rejected the desired procedure with an integrity protected message or a non-integrity protected message, the UE 100a may apply the eDRX cycles. Further, only if the network entity 100b has rejected the desired procedure with the integrity protected message, the UE 100a may continue to apply the eDRX cycles.

In an example embodiment, In a case where the UE 100a may have already negotiated the eDRX parameters in the desired procedure, the UE 100a may initiate the desired procedure again, and if this specific procedure fails (e.g., due to specific procedure abnormal cases as defined in 3GPP TS 24.008 or 24.301 or due to specific procedure reject example cause value #22 as defined in 3GPP TS 24.008 or 24.301). Then, the UE 100a may be switched to use the normal DRX cycles. According to this example embodiment, the UE 100a may be switched to the normal DRX cycles only when a GPRS mobility management (GMM) or an EPS Mobility Management (EMM) has moved to a certain state (e.g., Attempting to Update, Attempting to Attach, or while the UE 100a changes the update status to any value other than GU1 UPDATED or EU1 UPDATED).

If the UE 100a receives a reject message including reject cause #22, the UE 100a may apply the normal DRX cycles irrespective of whether the UE 100a have applied the normal DRX cycles or the eDRX before the reject message is received.

Accordingly, the method provides a mechanism to avoid continuous enabling and disabling of the eDRX by sending the request by the UE 100a to the network entity 100b. Once the eDRX is enabled, the UE 100a may not be able to request to disable the eDRX for a time determined by a timer, which can be configured or provided by the network entity 100b to the UE 100a. Once the request to stop the eDRX is requested, the UE 100a may disable sending of the eDRX for a time determined by the timer, which can be configured or provided by network entity 100b to the UE 100a.

In an example embodiment, if the UE 100a has requested for the eDRX parameter in the desired procedure, which the network entity 100b has accepted and sent the specific procedure accept, but the UE 100a has not been able to receive the accept message due to some lower layer failures (e.g., Handover failure) or other possible reasons mentioned as per 3GPP TS 24.008 or 24.301, then the network entity 100b may not use the eDRX parameters provided in the accept message. Instead, the network entity 100b may continue to use the normal DRX parameters while paging the UE 100a. In an example embodiment, the network entity 100b may use both normal DRX values and eDRX values provided to the UE 100a to determine the paging interval. In an example embodiment, the network entity 100b may continue to use previously negotiated normal DRX values or eDRX values with the UE 100a to determine the paging interval.

Unlike conventional methods, methods according to some example embodiments may be used to handle the eDRX and improve performance of the UE 100a by reduction of excessive signaling, avoiding more battery consumption, and/or avoiding of DRX cycle mismatch between the UE 100a and the network entity 100b. The detailed sequence diagram illustrating a method to avoid the DRX cycle mismatch between the UE 100a and the network entity 100b have been explained in conjunction with the FIG. 2E.

FIG. 5 shows the UE 100a, but example embodiments are not limited thereto. In some example embodiments, the UE 100a may include less or more number of components, functional blocks, or circuits. Further, the labels or names of the components, functional blocks, or circuits are used only for illustrative purpose and does not limit the scope of the inventive concepts. One or more components, functional blocks, or circuits may be combined together to perform the same or substantially similar functions in the UE 100a.

Figure 6:
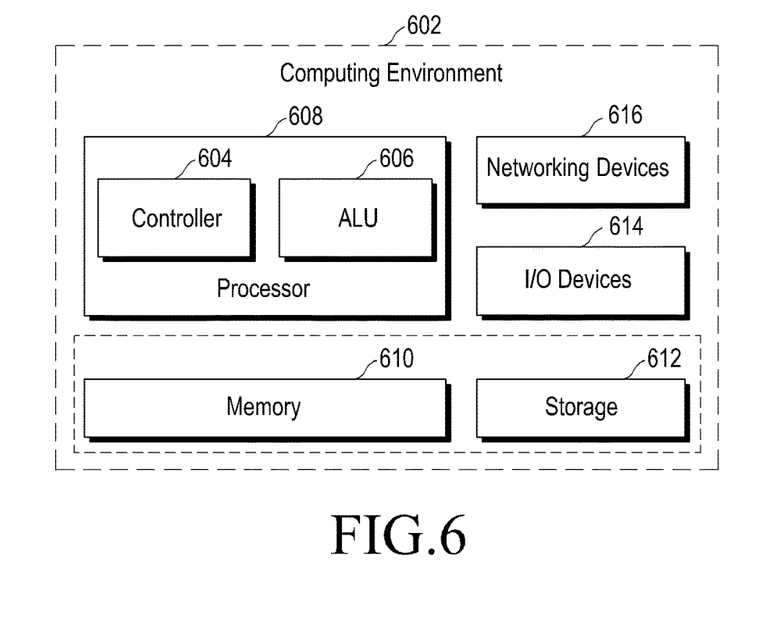
FIG. 6 illustrates a computing environment implementing a method and a UE for managing an eDRX, according to an example embodiment as disclosed herein.

FIG. 6 illustrates a computing environment implementing a method and the UE 100a for managing the eDRX, according to an example embodiment as disclosed herein. As depicted in the figure, the computing environment 602 may include at least one processor 608 that is equipped with a controller 604 and an Arithmetic Logic Unit (ALU) 606, a memory 610, a storage 612, plurality of networking devices 616, and a plurality Input output (I/O) devices 614. The processor 608 may be responsible for processing computer-readable instructions. The processor 608 may perform processing in response to commands received from the controller 604 therein. Further, any logical and arithmetic operations involved in the execution of the instructions may be computed by the ALU 606.

The overall computing environment 602 may include multiple homogeneous and/or heterogeneous cores, multiple CPUs of different kinds, special media and other accelerators. The processor 608 may be responsible for processing instructions. Further, the plurality of processors 608 may implemented by a single chip or by multiple chips.

Instructions and codes desired for implementation of respective functions may be stored in either the memory 610 or the storage 612, or both. At the time of execution, the instructions may be fetched from the corresponding memory 610 or storage 612, and be executed by the processor 608.

Various networking devices 616 or external I/O devices 614 may be connected to the computing environment 602 and support the networking devices 616 and the I/O devices 614.

The example embodiments disclosed herein may be implemented through at least one software program running on at least one hardware device and performing network management functions to control the elements. The elements shown in the FIGS. 2A through 6 include blocks which can be implemented by at least one of a hardware device, a software module, or a combination of the hardware device and the software module.

The foregoing description of some example embodiments will so fully reveal the general nature of example embodiments that others can, by applying current knowledge, readily modify or adapt for various applications such specific example embodiments without departing from the inventive concepts. Therefore, adaptations and modifications of the example embodiments may be possible within the meaning and range of equivalents of the disclosed example embodiments. The phraseology or terminology employed herein is for the purpose of description and not of limitation. Therefore, while some example embodiments have been described, those skilled in the art will recognize that the example embodiments herein can be practiced with modification within the spirit and scope of the inventive concepts.

What is claimed is:

1. A method for managing an extended discontinuous reception (eDRX) in a user equipment (UE), the method comprising:
    determining, by the UE, as to whether an eDRX enablement avoidance criterion is met;
    causing, by the UE, to stop sending a request message, which is configured to enable the eDRX, to a network entity in response to a result of the determining indicating that the eDRX enablement avoidance criterion is met; and
    sending, by the UE, the request message, configured to enable the eDRX, to the network entity in response to the result of the determining indicating that the eDRX enablement avoidance criterion is not met,
    wherein the eDRX enablement avoidance criterion includes whether a number of attempts made to enable and disable the eDRX exceeds a threshold.

2. The method of claim 1, wherein the eDRX enablement avoidance criterion further includes one of a data transmission pattern, a historic eDRX usage pattern, whether a configurable retry timer is deactivated, whether a number attempts made to enable the eDRX exceeds a threshold, whether a request accept message including an indication that eDRX is not supported, is received from the network entity, or whether an indication of no eDRX support is received from the network entity.

3. The method of claim 1, further comprising:
    sending, by the UE, the request message, configured to enable the eDRX, to the network entity to enable the eDRX with different eDRX periods.

4. The method of claim 1, further comprising:
    sending, by the UE, the request message, configured to enable the eDRX, to the network entity to enable the eDRX with different eDRX cycles.

5. The method of claim 1, wherein the request message includes one of a routing area update (RAU) message, a tracking area update (TAU) message, or an ATTACH message.

6. A user equipment (UE) for managing an extended discontinuous reception (eDRX), the UE comprising:
    a memory configured to store computer-readable instructions; and
    one or more processors configured to execute the computer-readable instructions such that the one or more processors are configured to,
        determine as to whether an eDRX enablement avoidance criterion is met,
        cause to stop sending a request message, which is configured to enable the eDRX, to a network entity in response to a determined result indicating that the eDRX enablement avoidance criterion is met, and
        send, by the UE, the request message, configured to enable the eDRX, to the network entity in response to the determined result indicating that the eDRX enablement avoidance criterion is not met,
    wherein the eDRX enablement avoidance criterion includes whether a number of attempts made to enable and disable the eDRX exceeds a threshold.

7. The UE of claim 6, wherein the eDRX enablement avoidance criterion further includes one of a data transmission pattern, a historic eDRX usage pattern, whether a configurable retry timer is deactivated, whether a number attempts made to enable the eDRX exceeds a threshold, whether a request accept message including an indication that eDRX is not supported, is received from the network entity, or whether an indication of no eDRX support is received from the network entity.

8. The UE of claim 6, wherein the one or more processors are further configured to request the network entity to enable the eDRX with different eDRX periods.

9. The UE of claim 6, wherein the one or more processors are further configured to request the network entity to enable the eDRX with different eDRX cycles.

10. The UE of claim 6, wherein the request message includes one of a routing area update (RAU) message, a tracking area update (TAU) message, or an ATTACH message.

* * * * *